United States Patent
Ohta

[19]

[11] Patent Number: 5,878,277
[45] Date of Patent: Mar. 2, 1999

[54] COMMUNICATION SYSTEM HAVING AT LEAST TWO TYPES OF COMMUNICATION CHANNELS

[75] Inventor: Yoshito Ohta, Tokorozawa, Japan

[73] Assignee: Hitachi Denshi Kabushiki Kaisha, Tokyo, Japan

[21] Appl. No.: 651,813

[22] Filed: May 21, 1996

[30] Foreign Application Priority Data

May 23, 1995 [JP] Japan ................................ 7-123983

[51] Int. Cl.$^6$ .................................................. G06F 13/00
[52] U.S. Cl. .......................................... 395/857; 370/225
[58] Field of Search ............................ 395/200.74, 857, 395/100; 370/445, 265, 312, 286, 337, 60.1, 496, 225, 404; 379/265, 202; 455/2

[56] References Cited

U.S. PATENT DOCUMENTS

| | | | |
|---|---|---|---|
| 4,750,171 | 6/1988 | Kedar et al. | 370/445 |
| 4,993,014 | 2/1991 | Gordon | 370/225 |
| 5,072,442 | 12/1991 | Todd | 370/265 |
| 5,091,849 | 2/1992 | Davis et al. | 395/100 |
| 5,128,934 | 7/1992 | Jasinski | 370/312 |
| 5,214,682 | 5/1993 | Chack et al. | 379/265 |
| 5,255,264 | 10/1993 | Cotton et al. | 370/286 |
| 5,467,452 | 11/1995 | Blum et al. | 395/200.74 |
| 5,495,522 | 2/1996 | Allen et al. | 379/202 |
| 5,526,353 | 6/1996 | Henley et al. | 370/60.1 |
| 5,566,353 | 10/1996 | Cho et al. | 455/2 |
| 5,586,121 | 12/1996 | Moura et al. | 370/404 |
| 5,613,198 | 3/1997 | Ahmadi et al. | 370/337 |
| 5,659,542 | 8/1997 | Bell et al. | 370/496 |

FOREIGN PATENT DOCUMENTS

WO 89/09967  10/1989  WIPO ........................................ 13/38

Primary Examiner—Wayne Amsbury
Assistant Examiner—Thuy Pardo
Attorney, Agent, or Firm—Antonelli, Terry, Stout & Kraus, LLP

[57] ABSTRACT

A communication system having a central station and a plurality of terminal stations coupled through a bi-directional communication path such that the terminals communicate with each other through the central station, has dedicated communication channels assigned to couple a terminal station with another terminal station and common communication channels simultaneously assigned to the plurality of terminal stations in a multiplexing manner. The central station has a control unit for selecting one from the dedicated communication channels and the common communication channels in response to a communication request from a terminal station.

19 Claims, 11 Drawing Sheets

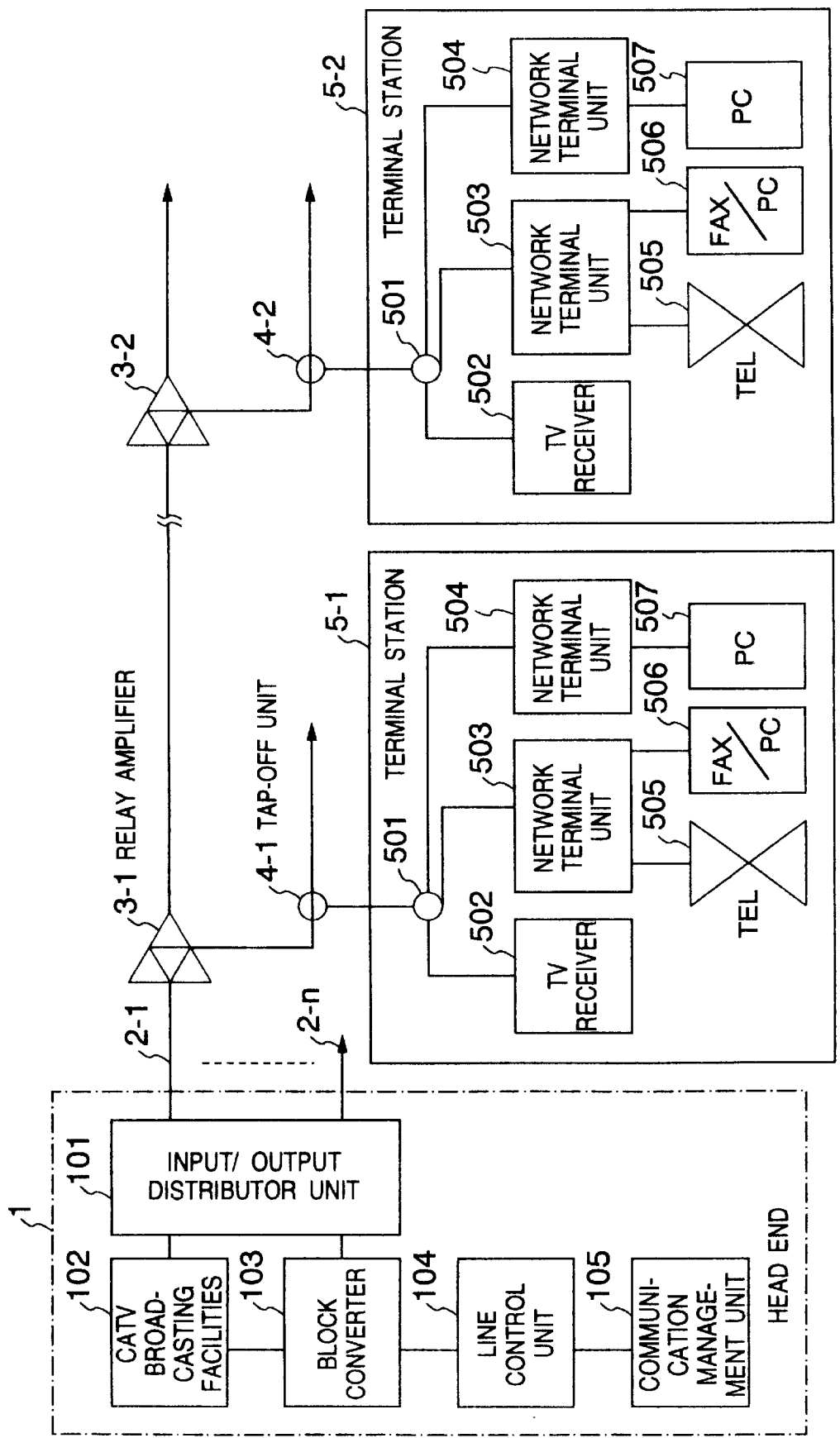

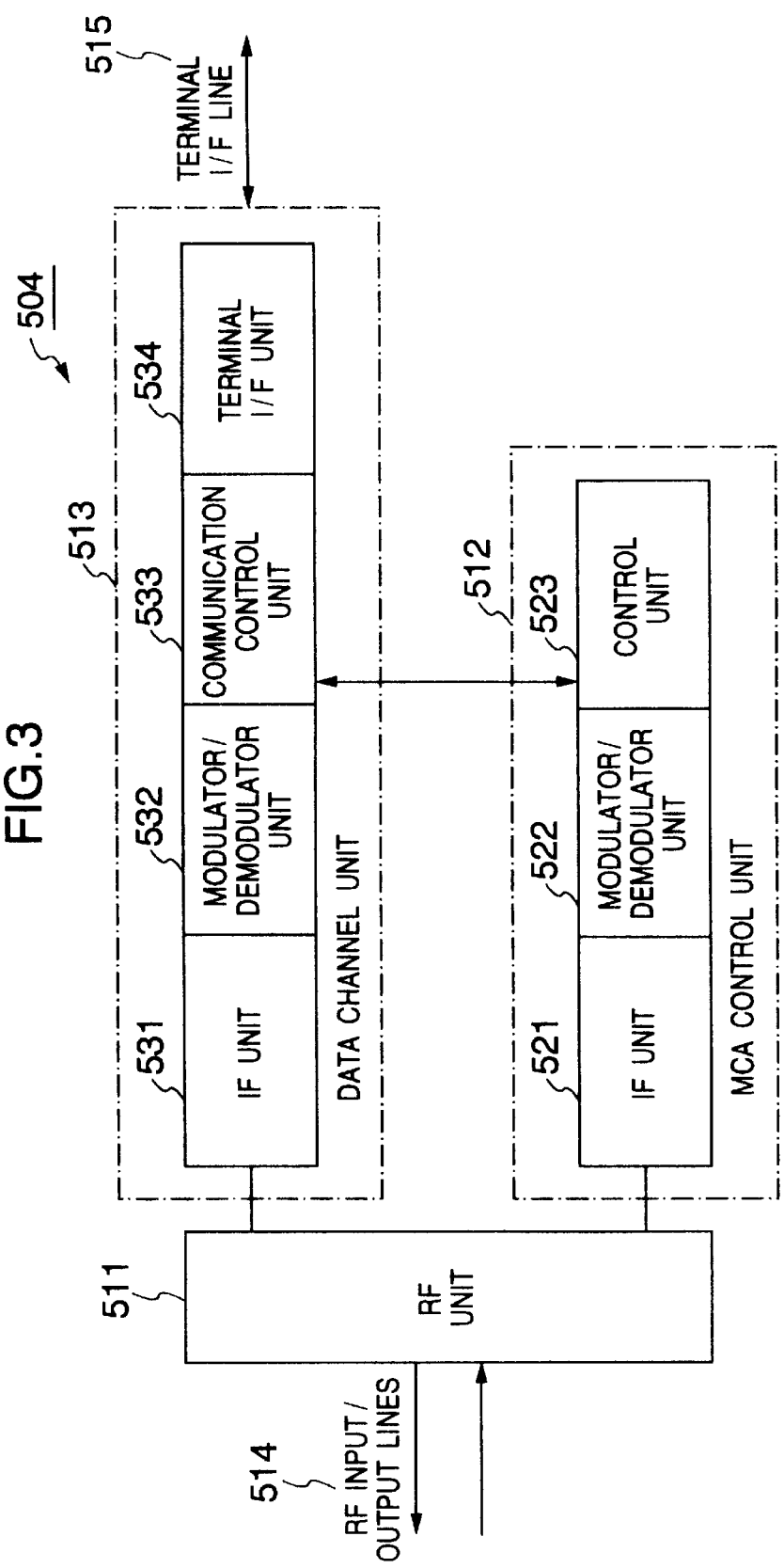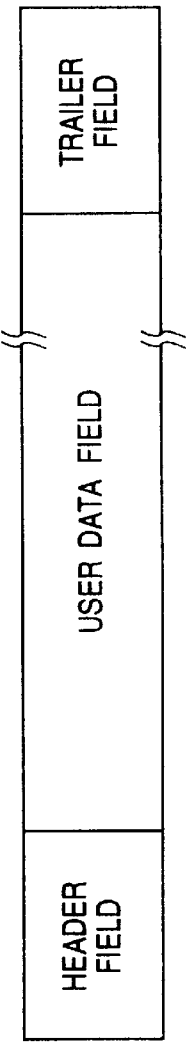

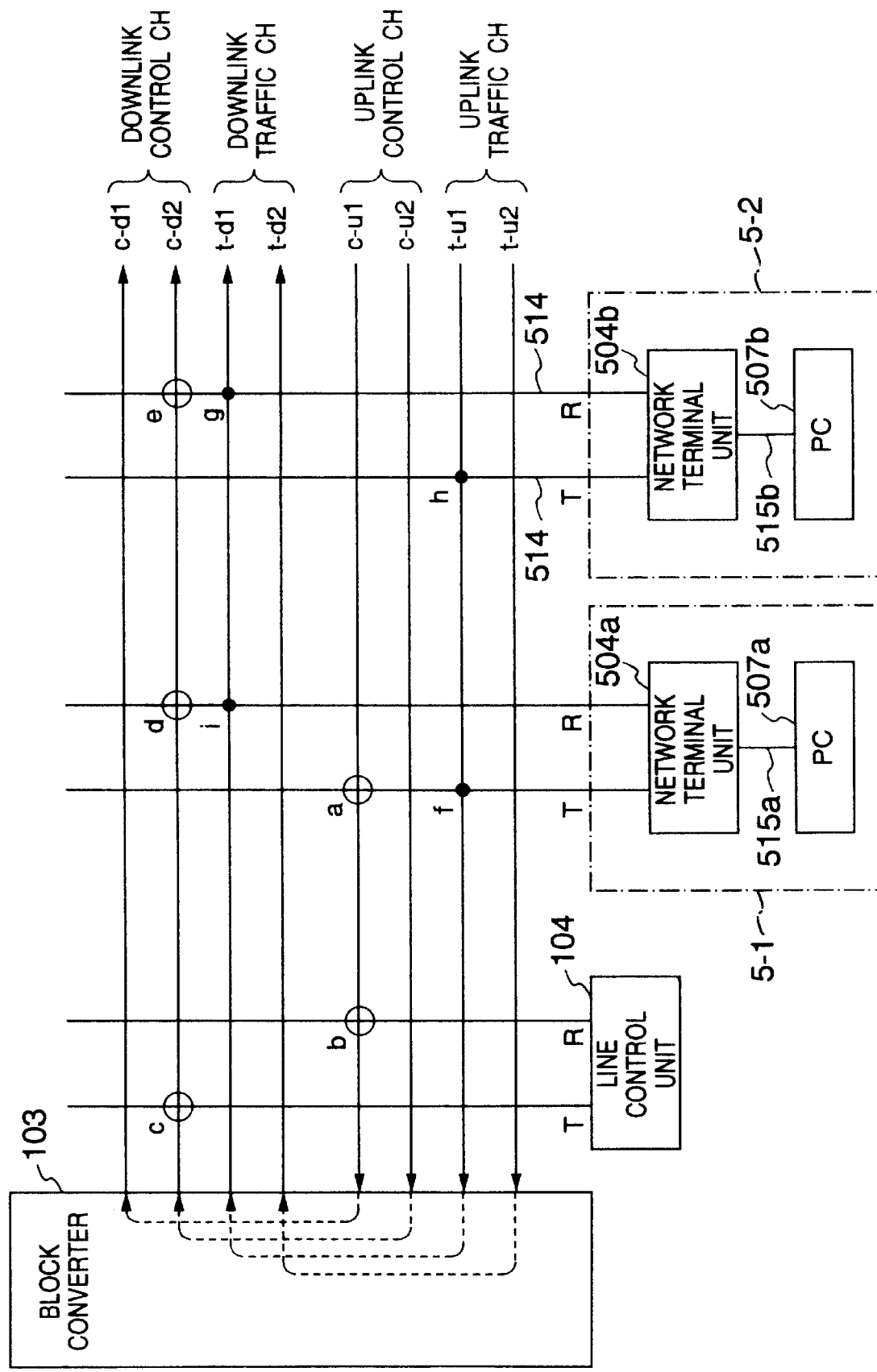

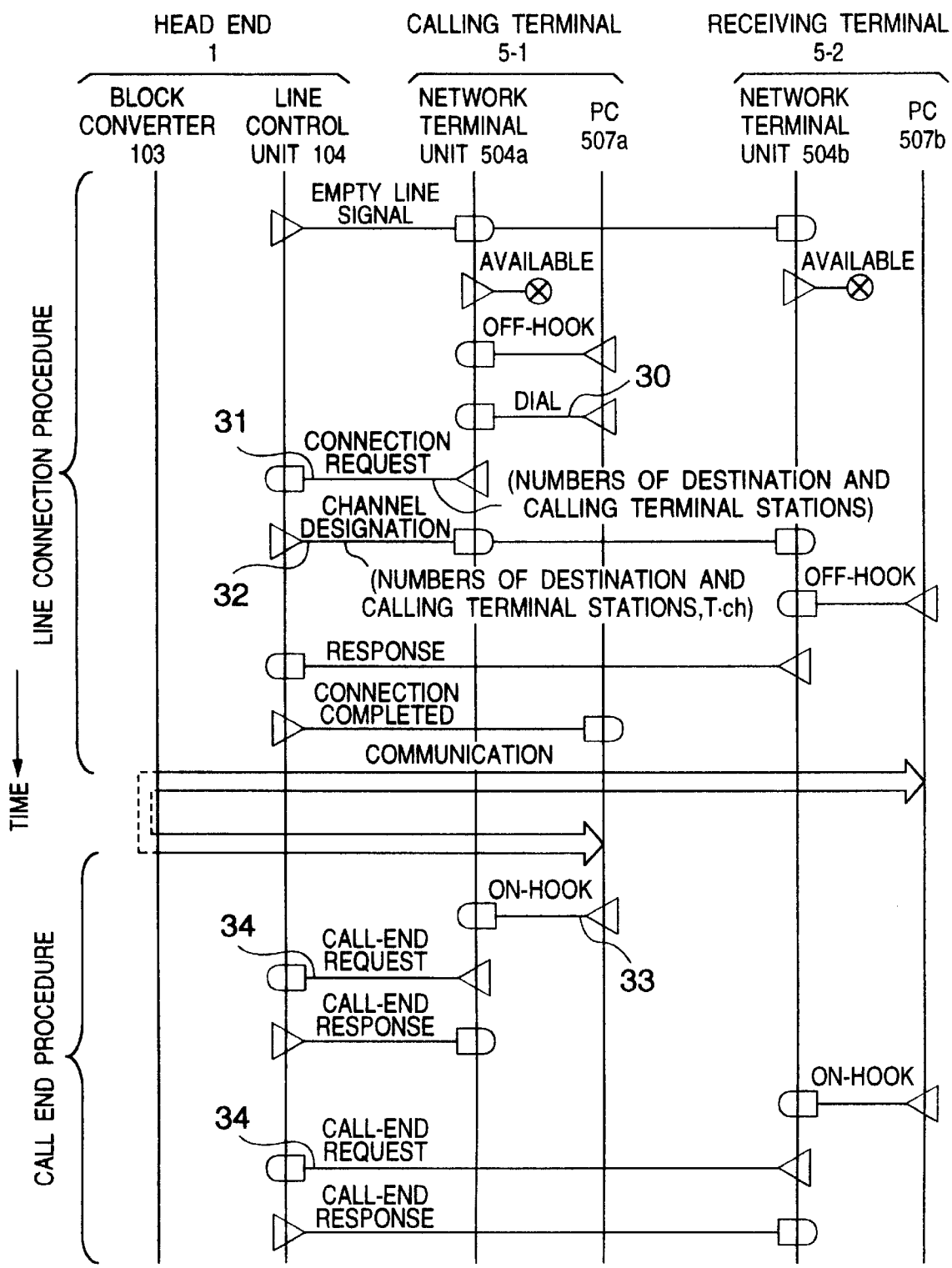

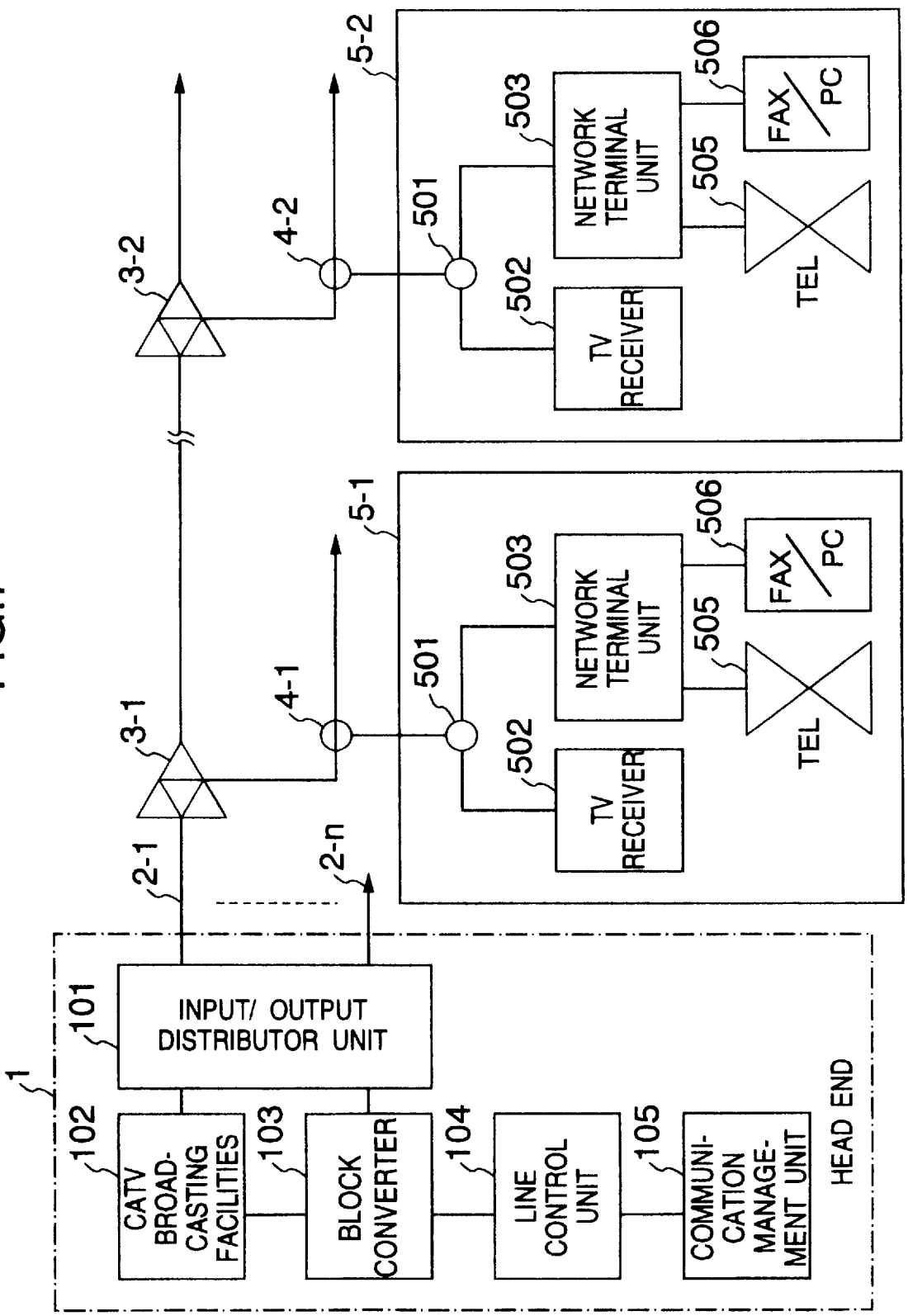

FIG.11

| ITEM NO. | ITEM | | SPECIFICATIONS |
|---|---|---|---|
| 1 | UTILIZED FREQUENCY BAND (STANDARD) | UPLINK | 2.5 MHz WITHIN 42~48 MHz |
| | | DOWNLINK | 2.5 MHz WITHIN 230~236 MHz |
| 2 | NUMBER OF CARRIER WAVES (UPLINK/DOWNLINK) | | 200 WAVES EACH (INCLUDING CONTROL CHS) |
| 3 | INTERVALS OF CARRIERS | | 12.5 KHz |
| 4 | NUMBER OF CHANNELS | | 200 CHANNELS |
| 5 | MODULATION METHOD | | FM |
| 6 | TRANSMISSION LEVEL (CENTRAL STATION / TERMINAL STATION) | | 100~110 / 90~110 dBμ |
| 7 | RECEPTION LEVEL (CENTRAL STATION / TERMINAL STATION) | | 65~75 / 50~80 dBμ |
| 8 | OUT-BAND UNDESIRED SEND-OUT | | BLOCKED BY FILTER OF 3 MHz BANDWIDTH |
| 9 | CONTROL CHANNEL | | MSK MODULATION SCHEME, 2,400 bps MODEM REDUCED CYCLE CODES, ERROR CORRECTING METHOD EMPLOYED |
| 10 | SWITCHING CONTROL SCHEME | | MCA |

FIG.12

| ITEM | SPECIFICATION |
|---|---|
| SWITCHING SCHEME | DIGITAL SWITCHING |
| ACCESS SCHEME | DOWNLINK TDM / UPLINK TDMA |
| USED BANDWIDTH | 6 MHz |
| NUMBER OF CARRIERS (UPLINK, DOWNLINK) | FOUR EACH |
| INTERVALS OF CARRIER FREQUENCIES | 1.5 MHz |
| TRANSMISSION RATE / SUB CHANNEL | 2.048 Mbps |
| MODULATION SCHEME | QPSK |
| CALL CHANNEL SHARING CONTROL SCHEME | DEMAND ASSIGN |
| NUMBER OF CHANNELS | 24 CHANNELS / CARRIER |
| SPEECH CODEC SCHEME | 64 Kbps (PCM) |
| SAMPLING FREQUENCY | 8 KHz |
| CODING SCHEME | $\mu$ - Law (PCM) |

COMMUNICATION SYSTEM HAVING AT LEAST TWO TYPES OF COMMUNICATION CHANNELS

BACKGROUND OF THE INVENTION

The present invention relates to a communication system having at least two types of communication channels which has a central station and a plurality of terminal stations connected through a bi-directional communication path such that the terminals communicate with each other through the central station. More particularly, the present invention is directed to a communication system suitable for use in multimedia applications utilizing a wide variety of information forms such as audio information, output data of computers, text information, graphics, moving pictures, and so on.

In recent years, communication systems utilizing CATV (Community Antenna TV) networks have drawn attention as a new communication infrastructure in Japan as well as in the other countries. An example of a communication system responding to this trend is an MCA/C telephone system which is also given a common name of "analog CATV telephone" in a practical world. Since the MCA/C telephone system is an application of a multi-channel access (hereinafter abbreviated as "MCA") scheme based on the FM radio communication technology, which has already given positive achievement in the field of radio communications, to the CATV network, the name "MCA/C" was derived from MCA with "C" as the meaning of "on Cable" added thereto.

The MCA/C telephone system utilizes a 2.5 MHz band for each of uplink and downlink in a CATV transmission path to provide 200 communication channels at carrier frequencies located at intervals of 12.5 KHz, as shown in a main specification table of FIG. 11.

An example of the conventional MCA/C telephone system is illustrated in FIG. 7. Specifically, FIG. 7 is a block diagram illustrating an example of the MCA/C systems of a type which shares part of facilities for a CATV system for operation. The illustrated system comprises a head end 1 positioned in a central portion of the CATV system and a plurality of trunk line cables 2-1–2-n extending from the head end 1 to different directions.

The head end 1 is provided with an input/output distributor unit 101 from which the trunk line cables 2-1–2-n branch out. The input/output distributor unit 101 is connected to CATV broadcasting facilities, generally designated by 102, and a block convertor 103 through which a line control unit 104 and a communication management unit 105 are connected to the input/output distributor unit 101.

While the trunk line cables 2-1 - 2-n are extended in every direction, it is a general tendency to divide the trunk line cables in a plurality of directions in order to limit the number of subscribers accommodated therein and the length of cables. The trunk line cables in the respective directions are extended by inserting bi-directional relay amplifiers 3-1, 3-2 at multiple stages.

Branch cables branched from the bi-directional relay amplifiers 3-1, 3-2 have tap-off units 4-1, 4-2 from which the branch cables are further branched to respective subscribers 5-1, 5-2, thus configuring a tree type network as a whole.

Customer stations of the respective subscribers 5-1, 5-2 each include a distributor 501, a television receiver 502, a network terminal unit 503, a telephone 505, and a personal computer having a function of facsimile (hereinafter abbreviated as "FAX/PC") 506, such that the subscribers 5-1, 5-2 are permitted to receive television programs on multiple channels as well as to utilize the telephone, FAX/PC and so on for intra-communications within the system. The intra-communications employ a bi-directional transmission scheme in which a direction from subscribers to the head end is defined "uplink" and a direction from the head end to subscribers is defined "downlink".

Instead of the MCA/C telephone system, the development of a system generally called a "digital CATV telephone" has been advanced in recent years to follow the trend of digitization in the world. A time-division multiple access (hereinafter abbreviated as "TDMA") scheme is employed as a means for implementing the digital CATV telephone.

In a digital CATV telephone system under development, a communication channel has a bandwidth equal to the bandwidth assigned to one channel of the NTSC television standard.

Examples of the TDMA schemes for the digital CATV telephone systems are given below:

① An exemplary system utilizes an entire 6 MHz bandwidth and performs quadrature phase shift keying modulation (hereinafter abbreviated as "QPSK modulation") to ensure a transmission rate of approximately 8 Mbps, so as to realize a TDMA scheme which provides a unit transmission rate of 64 Kbps for each terminal.

② Another exemplary system divides a 6 MHz bandwidth into four 1.5 MHz subchannels and performs QPSK modulation in each of the subchannels to ensure a transmission rate of approximately 2 Mbps, so as to realize a TDMA scheme which provides a unit transmission rate of 64 Kbps.

FIG. 10 illustrates a conceptual block diagram for explaining a line connecting operation in TDMA telephone communications utilizing a CATV network. Specifically, uplink time slots (channels) ts1, ts2, . . . , tsn and downlink time slots (channels) Ts1, Ts2, . . . , Tsn are shown along a transmission path. A terminal station 51 uses an uplink time slot ts1 for transmission and a downlink time slot Ts1 for reception, respectively, while a terminal station 52 uses an uplink time slot ts2 for transmission and a downlink time slot Ts2 for reception, respectively. A switching between an uplink time slot and a downlink time slot, represented by broken line arrows in the drawing, is performed by a switching unit 41 and a multiplexer unit 42 in a head end 40. Also, the terminal stations 51, 52 have network terminal units 513, 523 connected to a CATV transmission path and telephones 515, 525 connected to the network terminal units 513, 523, respectively.

FIG. 12 is a table listing main specifications for the TDMA scheme illustrated in FIG. 10. The table shows that the TDMA scheme of FIG. 10 utilizes a 6 MHz bandwidth for each of uplink and downlink in the CATV transmission path, and forms four subchannels which are assigned four carrier frequencies located at intervals of 1.5 MHz to provide 24 channels per subchannel and a communication channel having a total of 96 channels.

The first MCA/C telephone system used in practice as a general-purpose communications system utilizing a CATV network has a limit in its utilization. On the other hand, currently developed digital CATV telephones are now in a transition phase of the development. The TDMA schemes employed in so far disclosed digital CATV telephone systems have the following features and problems in relation to the characteristics of CATV networks, utilization form, business form, and so on.

First, the characteristics of CATV networks will be described.

(1) Bi-directional CATV networks having a tree-type network suffer from noise ingress (noise which has intruded into a distribution system and a customer line system and flows into a head end) in an uplink transmission band which is a peculiar phenomenon in the CATV networks. Thus, a transmission scheme exhibiting a higher noise resistance is required for the uplink transmission band in comparison with the transmission of television video signals and so on in a downlink transmission band.

(2) While the noise ingress may occur due to interference of radio equipment or the like in a particular band, a main cause of the noise ingress is generally considered to be an intrusion of noise generated from home electric appliances, industrial machines, or the like. An analysis of such noise with a spectrum analyzer or the like shows that impulse noise having narrow width and a short duration randomly occurs on the frequency axis. It can be said from this observation that a transmission scheme using a wider bandwidth is more likely to suffer from interference of the noise.

(3) In conventional CATV networks, even if bi-directional facilities are provided, the uplink transmission band including up to extreme ends of cables has been utilized less frequently than the downlink transmission band. Therefore, no attention has been paid to countermeasures to noise ingress in existing CATV networks, and a variety of experiments have gradually revealed that the level of noise ingress is generally in an unfavorable situation.

To improve the level of noise ingress, it is necessary to examine all terminals one by one to confirm sources of noise intruding into the uplink, to reinforce the shielding for cables themselves and contact portions of coaxial cables, and so on. However, since a single CATV system includes several thousand to fifty thousand terminals to be checked and repaired, a huge cost is anticipated to take countermeasures to the noise.

(4) The CATV network must also cope with noise possibly generated in its own network in addition to noise intruding from the outside as mentioned above. Such noise generated in the network is mainly caused by non-linearity of transmission paths.

Generally, CATV networks perform relay amplification at multiple stages in order to compensate for line loss. Thus, the CATV network has a problem of inter-channel interference generated by cross modulation, intermodulation, and so on due to non-linearity of the relay amplifiers, depending on the characteristics of relay amplifiers and the number of relay stages. As examples of countermeasures to prevent the influence of inter-channel interference from exceeding a tolerable limit, total transmission power is limited per channel of the television, and the number of channels is limited when a bandwidth assigned to one channel of the television is used in a frequency division multiple access scheme.

Since trunk line cables have been gradually replaced with optical fibers in CATV networks, a less number of relay stages is required so that the non-linearity of transmission paths tends to be improved as an overall network.

(5) It has been found that when wide-band high-speed digital transmission is performed in a CATV network, reflected waves caused by impedance miss-match of transmission paths may exert influences on the CATV network. To solve this problem, it would be necessary to modify the entire network even including customer lines and terminal equipment at extreme ends, so that an ideal modification of the network is anticipated to be difficult from the viewpoint of a cost required therefor.

(6) In CATV networks, a single coaxial cable is used to communicate uplink and downlink signals therethrough. Generally, CATV networks in Japan employ an uplink band from 10 MHz to 50 MHz and a downlink band from 70 MHz to 450 MHz (or 750 MHz). Even if the entire uplink band is available for transmission, a total number of available channels, each assigned a 6 MHz bandwidth, is merely six. In addition, the above-mentioned noise ingress is not present uniformly over the entire band but concentrates in a band from 10 MHz to 25 MHz. Thus, channels in such a noisy band cannot be used in practice. In the United States, the uplink band is narrower than that in Japan and is assigned a range of 10–30 MHz.

It can be understood from the circumstance mentioned above that the uplink channels are precious and should be efficiently utilized.

Next, the characteristics of the MCA/C telephone system will be described.

(7) Since the MCA/C telephone system employs a narrowband transmission scheme as compared with the characteristics of transmission paths used in the CATV network as mentioned above, it can advantageously provide fairly good transmission and a larger number of channels. However, the MCA/C telephone system has a disadvantage that the data transmission rate is limited to approximately 9,600 bps and cannot provide services which require higher transmission rates than this limit.

Next, the TDMA scheme has the following problems.

(8) As mentioned above, since digital CATV telephone systems employing currently known TDMA schemes use a wide band such as 6 MHz or 1.5 MHz, they are susceptible to the influence of noise ingress having the nature as mentioned above. In addition, the digital CATV telephone systems are disadvantageously susceptible to the influence of reflections due to impedance miss-match because of the wide-band high-speed transmission.

(9) Noise levels at respective terminal stations distributively located in a tree-type CATV network are not uniform but exhibit large variations depending on directions of trunk lines to which they are connected. However, to ensure a uniform transmission quality in an entire system, it is desirable to maintain a ratio of a carrier level to a noise level (C/N) at the same level at all terminal stations. A scheme which employs separate carriers to respective communication channels can employ weighted power distribution which assigns a higher transmission level to a communication with a terminal station connected to a path with a higher noise level within a tolerable range of total transmission power for one television channel. However, it is difficult to apply the weighted power distribution to the TDMA scheme which transmits a plurality of communication channels with a single carrier.

(10) In the TDMA scheme, PCM transmission at a rate of 64 Kbps is performed on a channel among analog telephones connected to an associated network. As a result, the TDMA scheme is inferior to the MCA/C telephone system in terms of a frequency utilization efficiency per 6 MHz. Specifically, when comparing these schemes in terms of the number of channels constituting an audio transmission band (0.3–3.4 KHz), the TDMA scheme has 96 channels while the MCA/C telephone system has 200 channels. Even in this case, the MCA/C telephone system utilizes only a limited 2.5 MHz band within the 6 MHz band.

(11) The CATV telephone systems typically employ a fixed rate system in order to avoid a huge facility cost which would otherwise be required to a meter rate telephone accounting management system. The fixed rate system charges the same telephone rate for a predetermined period irrespective of an actual utilization amount. There is a demand for a CATV telephone system which can accommodate as many subscribers as possible at a lower rate. The telephone communications schemes may be classified into the following two. A first scheme is an instantaneous communications scheme, such as a line connection scheme for the existing subscriber telephone system, in which once two terminals are connected through a line, the terminals occupy the line so that any other terminal is not permitted to access to the line until a call between the two terminals is terminated. A second scheme is a delay base scheme, as employed by LAN (local area network), in which a common line is assigned to a plurality of terminals such that each terminal is given a waiting time to access to the common line. In personal computer communications, the data transmission rate is determined by a signal transmission rate of each terminal even if a maximum signal transmission rate of a communication line is high. Also, even when computer terminals are connected through a communication line, there may be a period in which no data is actually transmitted therebetween. Thus, a line utilization ratio for some data communications between personal computers may generally indicate a small value. The latter communications scheme such as that employed by LAN may be appropriate for subscribers who have a data processing apparatus such as a computer connected to a CATV telephone system.

To increase the line utilization ratio, it is advantageous to employ a scheme which accommodates many terminals in a single channel and provides a delay base communications for these terminals, as is actually implemented in LAN. In such a LAN-type communications scheme, efficient utilization of lines can be accomplished by absorbing a difference in rate between terminals and lines and by allowing other terminals to utilize a line during a non-operating time during which the line is occupied but not actually utilized. However, in the TDMA scheme which relies on an instantaneous line switching scheme, communications with an increased line utilization ratio is difficult to realize.

(12) In addition, the TDMA scheme requires the assignment of two time slots, i.e., two channels for respective uplink and downlink in order to provide full-duplex communications, similarly to the assignment of audio channels in an MCA/C scheme, later described. In the LAN-type communication scheme, which assumes the employment of half-duplex communications, a bi-directional communication line can be constituted of only one channel.

While a variety of forms can be thought for data communications, most of them are data transmission from one terminal to another terminal. A system which reserves an empty line for always allowing for bi-directional simultaneous communications is disadvantageous in terms of the line utilization efficiency.

(13) The TDMA scheme employed in the CATV telephone system is based on 64 Kbps per channel. Generally, network terminal units at extreme ends of the network do not have a rate converting function, so that a terminal unit operating at a transmission rate different from that of the line requires an adaptor for the rate conversion. Since it is assumed in LAN that the rate of lines is basically different from that of terminals, the terminals in LAN are adapted to flexibly correspond to any transmission rate.

Finally, problems implied in LAN will be described.

(14) For example, in a LAN system as indicated by the LAN standard IEEE 802.3, a terminal connected to a node is allowed to transmit at any moment under predetermined conditions, and there is no means provided for controlling a total amount of traffic in a network such as regulation of transmission or the like.

When a LAN type communications scheme is applied to a CATV network, it is necessary to assume a system capable of accommodating a great number of subscribers. For example, it is thought that the CATV network should have a function of limiting new communication requests (regulating the assignment of these requests to a busy channel) in a traffic condition in which a waiting time exceeds a predetermined value.

(15) Some data supplied through a CATV network may often require fast and continuous data transmission, as is the case of a moving image. A communications scheme like LAN, which is designed basically for intermittent data transmission in packet units, is not suited to fast and continuous data transmission. To solve this problem, it will be necessary to occupy a channel in a condition close to line switching to enable the provision of continuous data transmission service depending on the form of information transmission.

Such a service is not intended for all of ordinary subscribers. For example, in an at-home welfare service, this service may be limited for particular utilization, for example, communications between hospitals or welfare centers and solitary elders' houses.

(16) The LAN system generally employs a transmission scheme which uses an entire band of a cable serving as a common transmission path. There has not been found any example which divides an entire band to form a plurality of channels for providing different services on the respective channels.

SUMMARY OF THE INVENTION

As one manner of utilizing a communication network in a multimedia environment, it can be thought to transmit information in a variety of forms such as audio information, facsimile, text information, graphics, moving pictures, and output data of computers through a single communication network, for example, a CATV network as a transmission medium. It is desirable that the information in a variety of forms can be efficiently transmitted among a large number of subscribers' terminals. CATV networks have gradually extended its service areas in recent years. Existing CATV networks mainly provides broadcasting of image information and are going to add a telephone communication service to existing services. It is relatively easy to connect a variety of information processing apparatuses and communications equipments mentioned above to the CATV networks. Also, a variety of information processing apparatuses and communication equipments including a telephone, a television, a facsimile apparatus, a computer, and so on can be relatively easily connected to a terminal station of each CATV subscriber. Once such a variety of communication services can be provided to subscribers, it is expected that a larger number of people will further subscribe to the CATV network.

However, collective transmission of a variety of information in different forms in the same transmission scheme is not preferred from a viewpoint of an efficient operation of the network.

For the transmission of telephone calls and moving pictures requiring continuity of information, the LAN scheme is not desirable because transmitted signals are likely to be divided in packet units. Preferred for this type of information is an instantaneous communication scheme in which once terminals are connected through a line for a communication, the terminals are allowed to occupy the line until they terminate the communication.

On the other hand, a communication scheme desirable to communications of information such as computer data is a delay base communication scheme such as the aforementioned LAN scheme which assigns a common communication channel to a plurality of different terminals.

It is an object of the present invention to provide a communication system which enables efficient multimedia communications in a bi-directional communication network, for example, a CATV network.

It is another object of the present invention to provide a communications system which is highly resistant to noise and enables economical multimedia communications.

According to one embodiment of the present invention suitable for a CATV network in a multimedia environment, both of the above-mentioned schemes, i.e., instantaneous communication scheme and delay base communication scheme can be selectively used depending on a form of information to be communicated, from a viewpoint of efficient utilization of the network. A frequency band of a communication path in the CATV network is divided into a band for the instantaneous communication scheme and a band for the delay base communication scheme.

Further, the band for the delay base communications scheme is divided into a plurality of channels to form narrowband channels, thereby achieving noise reduction and economical network utilization.

A communication system according to the present invention has a central station and a plurality of terminal stations coupled through a bi-directional communication path such that the terminal stations communicate with each other through the central station, wherein a dedicated communication channel is assigned for a communication between a terminal station and another terminal station, while a common communication channel is assigned to the plurality of terminal stations in a multiplexing manner, and the central station has a control unit for selecting one from the dedicated communication channel and the common communication channel in response to a communication request from a terminal station.

Further objects and advantages of the present invention will become apparent from the following description of the preferred embodiments with reference to the accompanying drawings.

BRIEF DESCRIPTION OF THE DRAWINGS

FIG. 1 is a block diagram generally illustrating the configuration of an embodiment of a multimedia communications system according to the present invention;

FIG. 3 is a block diagram illustrating the internal configuration of a network terminal unit for a data channel in one embodiment of the present invention;

FIG. 4 is a diagram illustrating a frame structure for a data packet in one embodiment of the present invention;

FIG. 5 is a schematic circuit diagram conceptually illustrating a multiplexing communication path for data channels in one embodiment of the present invention;

FIG. 6 is a diagram illustrating a sequence of operations on a data channel in one embodiment of the present invention;

FIG. 7 is a block diagram illustrating the configuration of an MCA/C telephone system;

FIG. 11 is a table listing main specifications for the MCA/C telephone system; and FIG. 12 is a table listing main specifications for the TDMA telephone system.

DESCRIPTION OF THE PREFERRED EMBODIMENTS

Figure 2A:
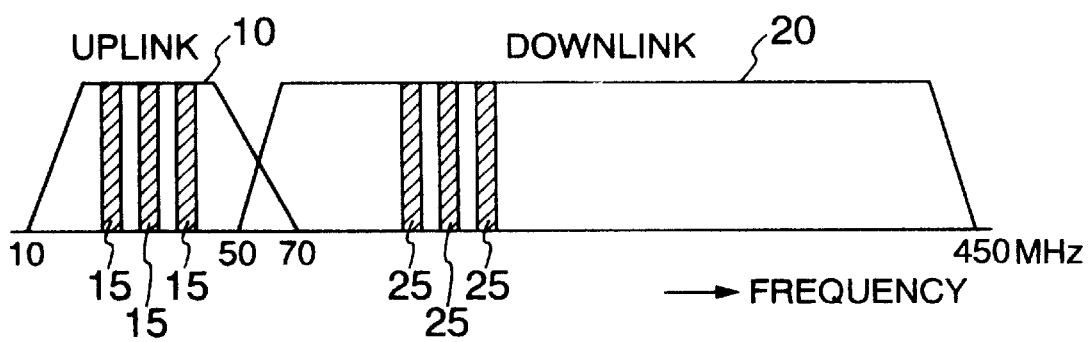
FIGS. 2A, 2B and 2C are graphs showing frequency assignments in one embodiment of the present invention.

A multimedia communications system according to the present invention will hereinafter be described in detail with reference to illustrated embodiments.

FIG. 1 illustrates one embodiment of the present invention which comprises a head end 1 serving as a central station of a CATV network; trunk line cables 2-1–2-n; relay amplifiers 3-1–3-n; tap-off units 4-1–4-2; and terminal stations 5-1–5-2.

The head end 1 internally comprises an input/output distributor unit 101; CATV broadcasting facilities generally designated by 102; a block convertor 103; a line control unit 104; and a communication management unit 105, as illustrated. Each of the terminal stations 5-1–5-2 internally comprises a distributor 501; a television receiver 502; an audio channel network terminal unit 503; a data channel network terminal unit 504; a telephone 505; a facsimile apparatus or a personal computer 506; and a personal computer 507, as illustrated.

Figure 2B:
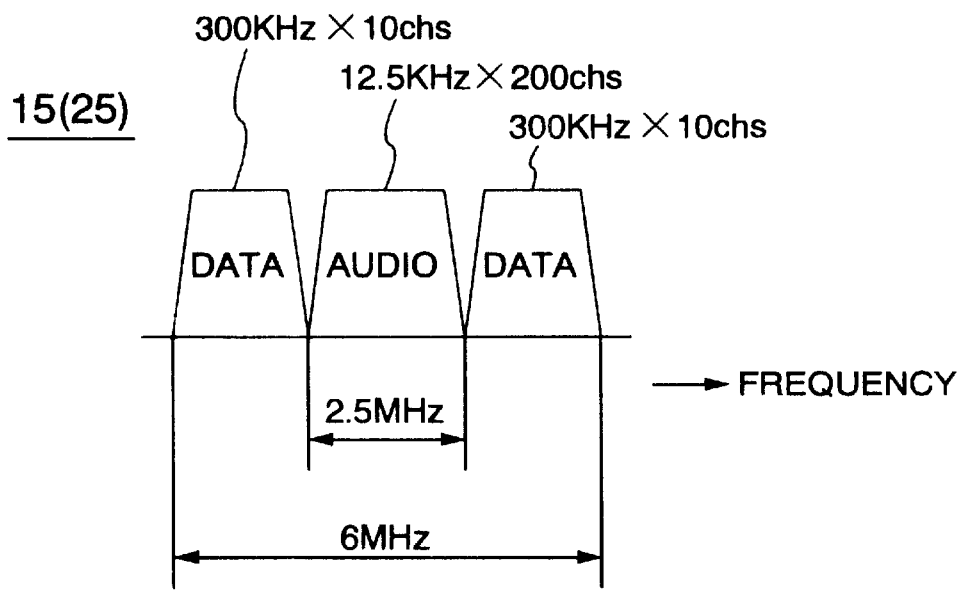
Figure 2C:
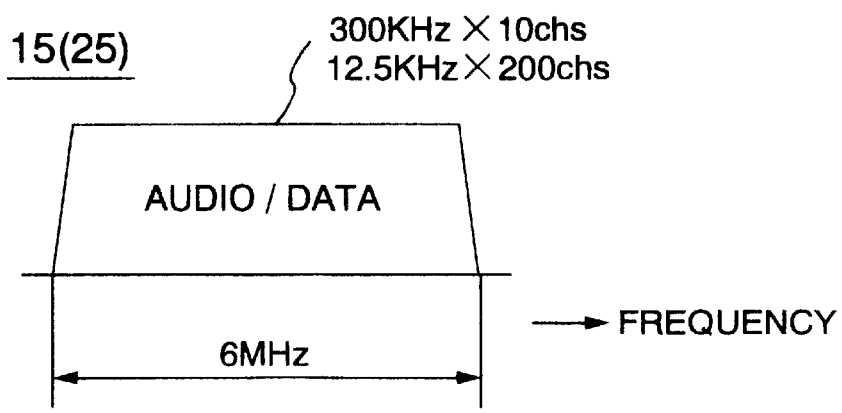

FIGS. 2A, 2B and 2C show frequency assignments for the communications system according to one embodiment of the present invention.

FIG. 2A is a diagram showing the assignment of frequency bands used on a communication path in the communications system to which the present invention is applied. An entire band 10 utilized for uplink signals transmitted from the terminals 5-1, 5-2 to the head end 1 ranges from 10 to 50 MHz, while an entire band 20 utilized for downlink signals reversely transmitted from the head end 1 to the terminal side ranges from 70 to 450 MHz. The multimedia communications system according to the present invention utilizes three empty bandwidths (6 MHz/channel) (indicated by hatched portions in FIG. 2A) 15, 25 in each of the uplink and downlink frequency bands, which have been originally assigned to the transmission of TV signals but are not actually used therefor in the CATV, for bi-directional transmission of audio signals (for telephones and facsimile apparatuses) and data signals (for computers). For more specific illustrations, exemplary assignments of signal bands in each of bandwidths 15, 25 indicated by hatched portions in FIG. 2A are shown in greater detail in FIGS. 2B and 2C, respectively.

The assignment shown in FIG. 2B consists of a 2.5 MHz audio signal band comprising 200 audio channels at intervals of 12.5 KHz located at a central portion of the band and two 3.0 MHz bands each comprising 10 data channels at intervals of 300 KHz on each side of the audio signal band within a 6 MHz band equal to one channel portion of the NTSC television standard. This assignment is similar to a basic assignment of channels in the conventional MCA/C scheme.

In FIG. 2C, 200 audio channels and 10 data channels are combined and arranged in an arbitrary order.

In this embodiment, an audio channel is capable of transmitting data at a transmission rate up to 9600 bps, in addition to making audio communications, when connecting a modem for an analog telephone or a facsimile apparatus to the terminal station. A data channel, in turn, is capable of transmitting data at a rate of 384 Kbps by using a modem employing a QPSK modulation scheme which may be built in the terminal station.

Next, the operation of the audio channel will be described in detail.

Figure 8:
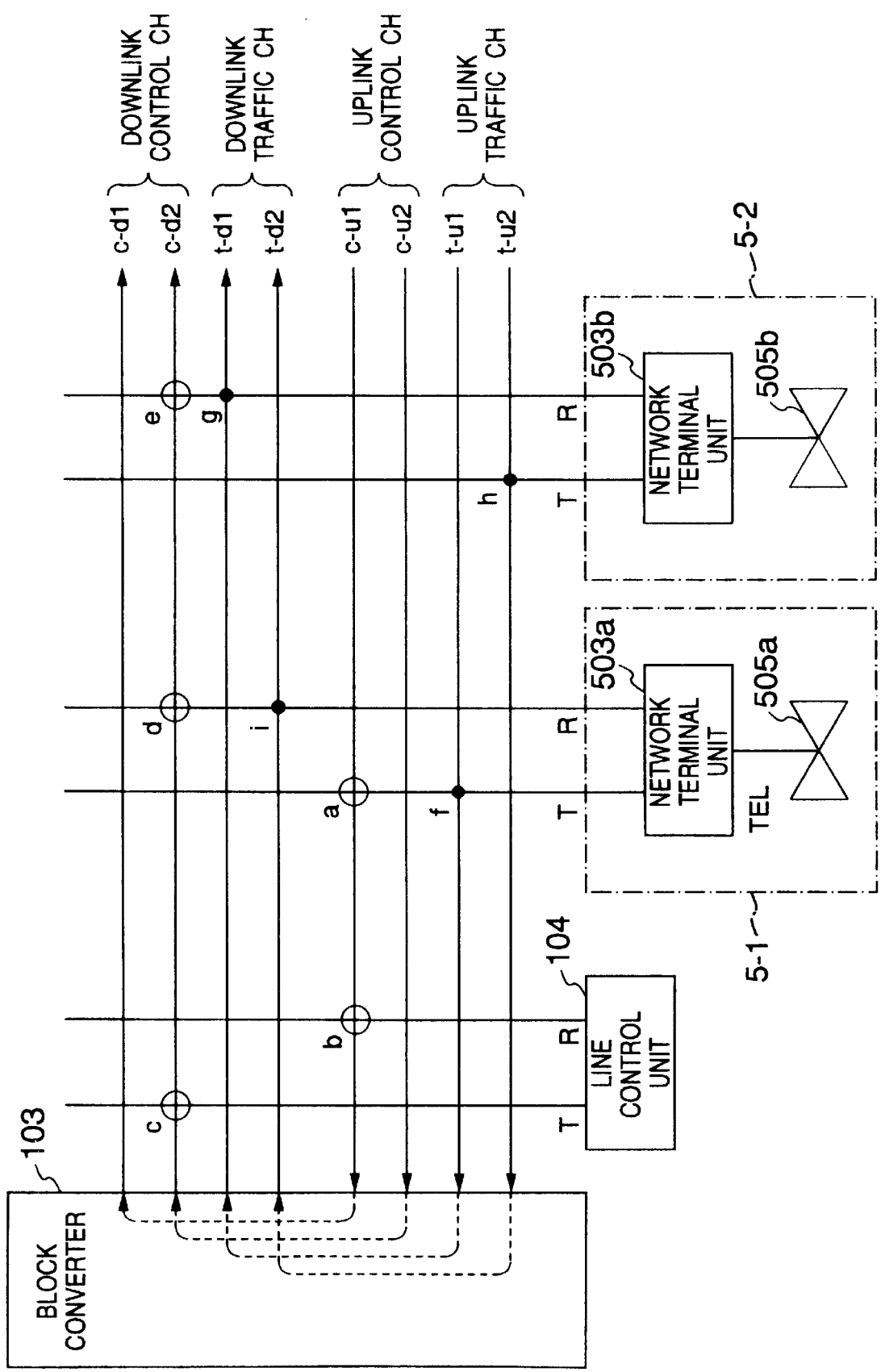
FIG. 8 a schematic circuit diagram conceptually illustrating a multiplexing communication path for data channels in the MCA/C telephone system.
Figure 9:
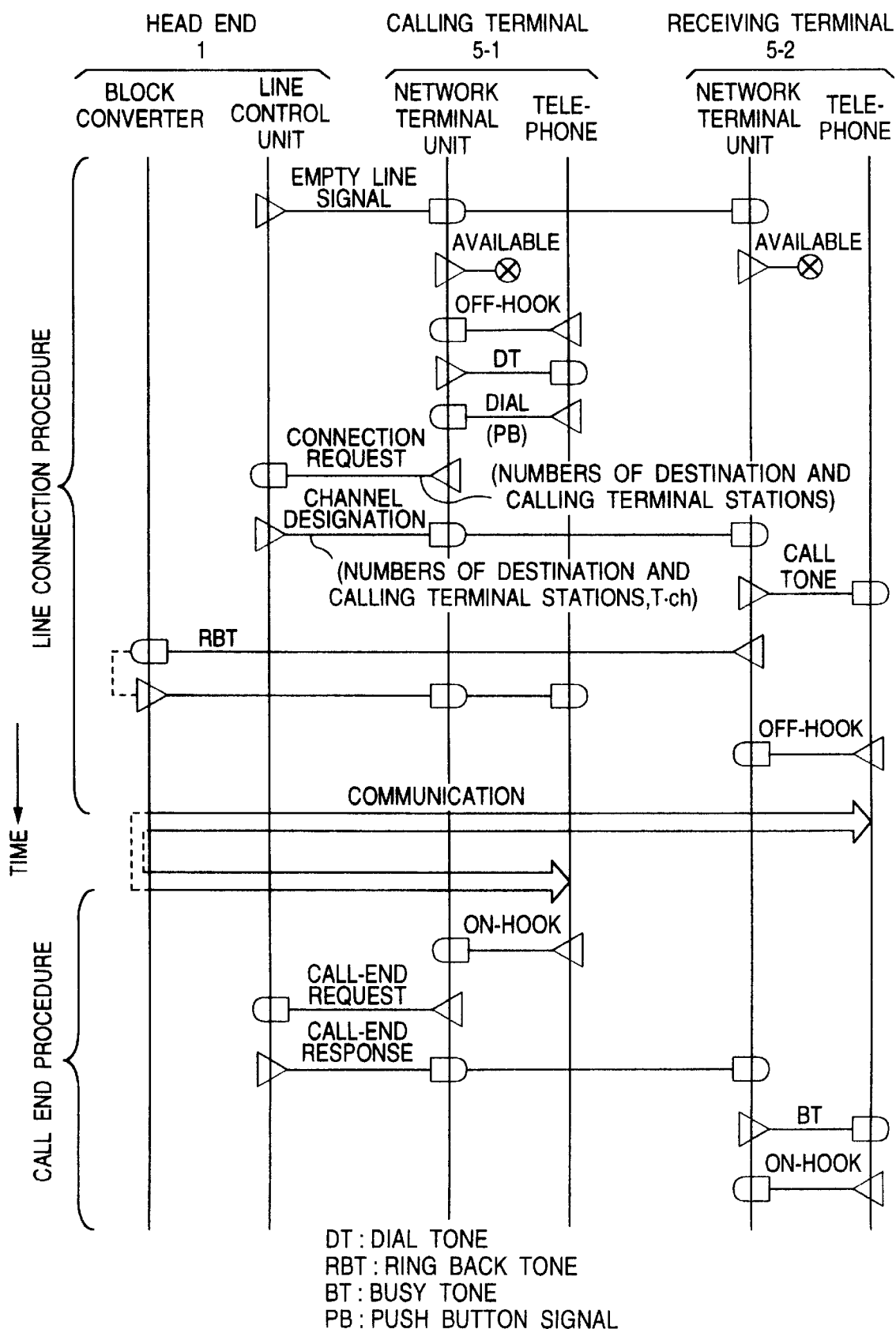
FIG. 9 is a diagram illustrating a sequence of operations on a data channel in the MCA/C telephone system.
Figure 10:
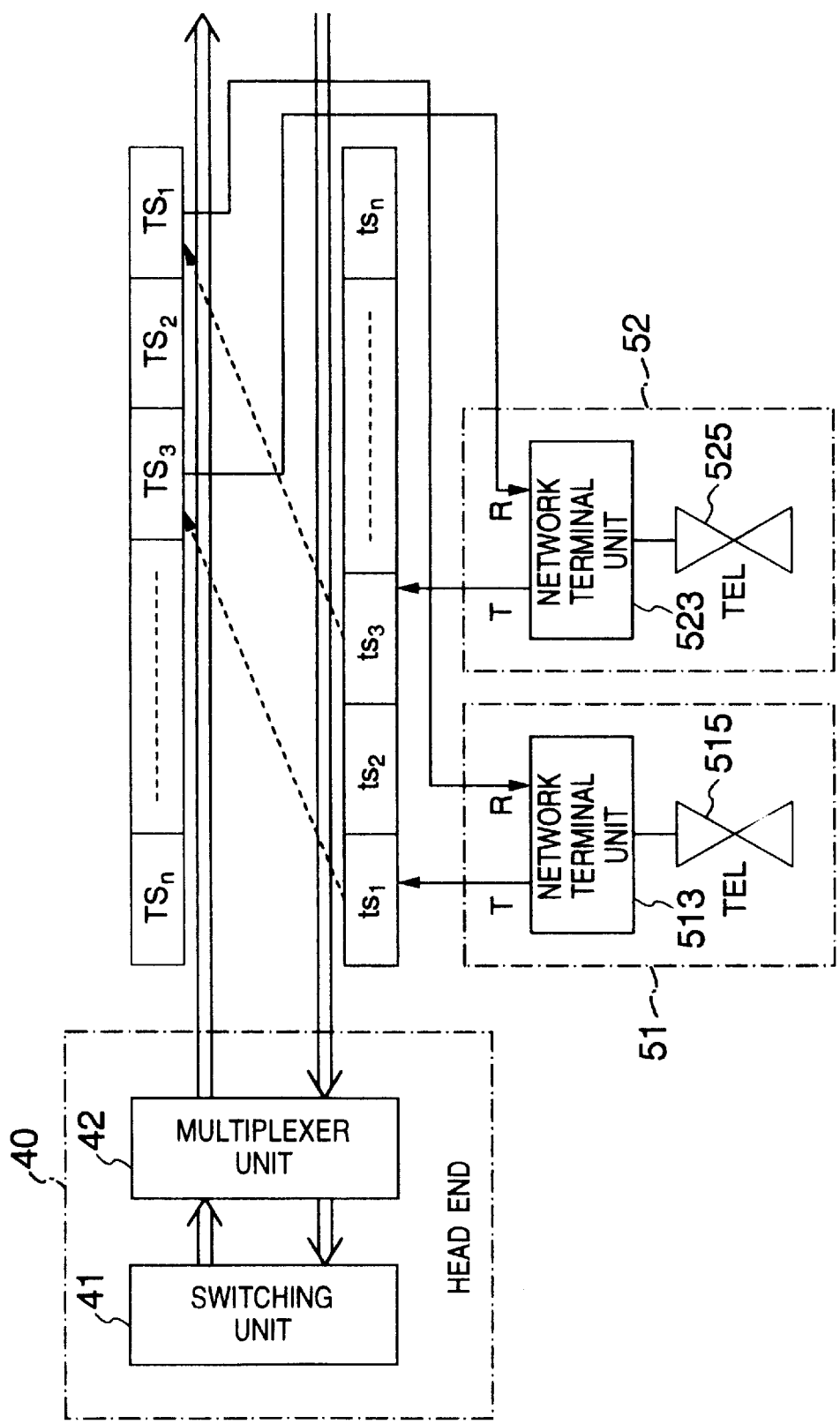
FIG. 10 is a diagram conceptually illustrating a TDMA telephone system.

The operation of the audio channel according to the present invention is identical to the counterpart in the conventional MCA/C telephone system. However, for the purpose of comparing the operation of the audio channel with the operation of the data channel, later described, the operation of the audio channel will be described below with reference to FIGS. 8, 9. FIG. 8 conceptually illustrates a multiplexing communication path of an MCA/C telephone system constituting part of the present invention, wherein frequencies are regarded as virtual cross point switches. FIG. 9 illustrates a sequence of operations in the MCA/C telephone system. It should be noted that respective channels are represented by independent signal lines in FIG. 8 for facilitating the understanding of the following description. It will be understood however that actually, a plurality of channels are transmitted on a single coaxial cable in a multiplexing manner.

Referring specifically to FIG. 8, the system comprises a block convertor 103; a line control unit 104, terminal stations 5-1–5-2; a network terminal unit 503; a telephone 505; downlink control channels c-d1–c-d2; uplink control channels c-u1–c-u2; downlink traffic channels t-d1–t-d2; and uplink traffic channels t-u1–t-u2.

First, a basic control operation for traffic channels in accordance with the MCA/C scheme using control channels will be described.

Assume now that a subscriber of the terminal station 5-1 is going to make a call with a subscriber of the terminal station 5-2. For example, the telephone 505a in the terminal station 5-1 confirms "channel available" in FIG. 9 and then transmits the telephone number PB of the subscriber of the terminal station 5-2. The network terminal unit 503a captures the uplink control channel c-u1 at a cross point "a" to transmit a "connection request" to the head end 1 through the control channel c-u1.

For preventing a collision with signals from other stations upon transmitting the "connection request", the communications system of the present invention employs Slotted ALOHA scheme which uses an "empty line signal" in FIG. 9 as a synchronization signal.

The "connection request" signal is transmitted from the terminal station 5-1 to the uplink control channel c-u1 in a time slot of a predetermined length based on the empty line signal delivered from the head end 1 to the control channel c-u1.

The line control unit 104 in the head end 1 receives the "connection request" signal through a cross point "b", and captures the downlink control channel c-d2 through a cross point "c" to transmit a "channel designation" to both the terminals 5-1, 5-2 based on the numbers of the call initiating terminal station and the call receiving terminal station included in the "connection request" signal when the "connection request" signal has been properly received without a collision with a signal from another terminal station. The "channel designation" is a signal for designating the number of a traffic channel for making a call between the two terminal stations.

The terminal stations 5-1, 5-2 receive the "channel designation" at their respective network terminal units 503 through cross points "d" and "e", respectively. In accordance with the designated numbers of the traffic channels, for example, the network terminal unit 503 of the terminal station 5-1 captures the uplink traffic channel t-u1 for transmission (T) through a cross point of "f" and the downlink traffic channel t-d3 for reception (R) through a cross point "i". On the other hand, the network terminal unit 503 of the terminal station 5-2 captures the uplink traffic channel t-u2 for transmission (T) through a cross point "h" and the downlink traffic channel t-d1 for reception (R) through a cross point "g". When a telephone 505b in the call receiving terminal station 5-2 responds to the "connection request" by an "off-hook" operation, a communication can be made between the terminal stations 5-1, 5-2.

In a standard sequence of operations for terminating a call, as illustrated in FIG. 9, the terminal station 5-1, which has first "on-hooked", returns the channel to the uplink control channel c-u1 through the cross point "a" to transmit a "call end request".

The terminal station 5-2, which on-hooked later than the terminal station 5-1, monitors a carrier on the traffic channel by a monitoring function corresponding to a squelch operation of an FM radio apparatus. If no carrier is found, the network terminal unit 503b automatically sends a busy tone to the telephone 505b in its own station 5-2, and accesses to a control channel so as to receive the "call end request" from the line control unit 104.

Next, description will be made on the operation for a communication between terminal stations when a traffic channel is used as a data channel.

FIG. 3 illustrates the internal configuration of the data channel network terminal unit 504 which comprises a high frequency unit (RF unit) 511; an MCA control unit 512; a data channel unit 513; an RF input/output line 514; and a terminal interface line (terminal I/F line) 515.

The MCA control unit 512 is internally composed of an intermediate frequency unit (IF unit) 521; a modulator/demodulator unit 522; and a control unit 523.

The data channel unit 513 is internally composed of an IF unit 531; a modulator/demodulator unit 532; a communication control unit 533; and a terminal I/F unit 534.

Before describing the operation of the data channel network terminal unit 504, functions of the respective components thereof will be generally explained.

The RF unit 511 operates using a 6 MHz band for each of uplink and downlink within an uplink frequency band 10–50 MHz and a downlink frequency band 70–450 MHz which are frequency bands used by the CATV network.

The MCA control unit 512 is a portion required for control operations using a control channel, in the audio channel network terminal unit 503. The IF unit 521 corresponds to signals at intermediate frequencies corresponding to used frequency bands at intervals of 12.5 KHz.

The modulator/demodulator unit 522 comprises an FM modulator/demodulator which is a basic model of the MCA/C scheme using the FM radio technology, and a modulator/demodulator for transmitting data on a control channel, for example, an MSK modulator/demodulator operable at a data transmission rate of 2400 bps.

The control unit 523 performs a communication control based on a sequence of operations, later described.

The MCA control unit 512 gives the data channel unit 513 an instruction to capture a data channel based on a "channel designation" received by the control operation as previously described with reference to FIGS. 8 and 9.

The data channel unit 513 transmits data at a rate of 384 Kbps in a bandwidth of 300 KHz, as mentioned above, and the IF unit 531 and the modulator/demodulator unit 532 support this data transmission rate.

It should be noted for reference that the data transmission at a rate of 384 Kbps in a bandwidth of 300 KHz is employed for a wireless region of digital transmission in the Personal Handyphone System (hereinafter abbreviated as "PHS") which is implemented as a cordless digital telephone system in Japan.

The communication control unit 533 and the terminal I/F unit 534 have the following functions.

① For interfacing with a terminal unit such as a telephone 505, a facsimile apparatus 506, a computer 507, or the like, the terminal I/F unit 534 supports synchronous or asynchronous transmission in accordance with RS232C/RS422 (EIA standard), and signals can be transmitted at 19.2 Kbps, 64 Kbps, 128 Kbps, and so on which exceed the rate supported by an audio channel. Thus, the communication control unit 533 and the terminal I/F unit 534 can perform a conversion between synchronous transmission and asynchronous transmission, and a rate conversion to 384 Kbps or an inverse rate conversion from 384 Kbps.

② Upon starting a communication, a terminal station performs an operation for requesting assignment of a data channel in response to a PB signal transmission operation of the terminal station. The terminal station performs the transmission in accordance with a procedure corresponding to AT commands which have been widely spread in personal computer communications. The terminal interface unit 534, which has a function of monitoring this procedure, receives the telephone number of a destination terminal station and sends it to the MCA control unit 512.

③ In a communication after receiving a "channel designation" from the MCA/C control unit and capturing a data channel, it is necessary to produce a data packet which does not depend on the protocol of any terminal station in order to enable connectionless communications. The data packet is produced by monitoring data frames which are transmitted irrespective of the protocol of the terminal stations in the same manner as a scheme employed by a bridge which is one of inter-LAN connection apparatuses. More specifically, the head and the end of a frame forming a signal received by the terminal I/F unit 534 of an associated terminal station are detected to produce a new data packet including the frame used as user data. If a long frame is received, the frame is divided into a plurality of data packets. An example of the data packet consists of a header field, a user data field, and a trailer field, as illustrated in FIG. 4.

④ Another operation performed after the network terminal unit 504 has captured a data channel is to permit a plurality of terminal stations to communicate on a single data channel in accordance with a delay base communications scheme which prevents collisions of data from the plurality of terminal stations by a function corresponding to CSMA/CD of IEEE 802.3.

The RF unit 511 and the IF unit 531 select a transmission and reception traffic channel under the control of the communication control unit 533 by specifying the frequency of the traffic channel through a control channel, such that associated terminal stations can mutually transmit and receive signals through the selected traffic channel.

Next, the operation of the data channel will be described in detail with reference to FIGS. 5 and 6.

FIG. 5 is a schematic circuit diagram conceptually illustrating a multiplexing communication path for data channels in one embodiment of the present invention, wherein frequencies are regarded as virtual cross point switches. FIG. 6 illustrates a sequence of operations for communications using the data channels of FIG. 5.

Referring specifically to FIG. 5, the system comprises a block convertor 103; a line control unit 104; terminal stations 5-1–5-2; a data channel network terminal unit 504; a personal computer 507; downlink control channels c-d1–c-d2; uplink control channels c-u1–c-u2; downlink traffic channels t-d1–t-d2; and uplink traffic channels t-u1–t-u2.

Assume now that the terminal station 5-1 is to make a communication with the terminal station 5-2. The personal computer 507 runs a communications program installed therein to transmit a dial signal 30 indicative of the telephone number of the terminal station 5-2 in accordance with the AT commands. A network terminal unit 504a receives the dial signal 30 transmitted from the personal computer 507a through a terminal I/F line 515a at a terminal I/F unit 534 (FIG. 3). Then, the dial signal 30 is passed to the MCA control unit 512 through a communication control unit 533 (FIG. 3). The MCA control unit 512 captures the uplink control channel c-u1 through a cross point "a" to transmit a "connection request" 31 including the telephone numbers of its own and the destination terminal station, as illustrated in FIG. 6, through the captured uplink control channel c-u1.

The line control unit 104 of the head end 1 receives the "connection request" 31 through a cross point "b", and captures the downlink control channel c-d2 through a cross point "c" to transmit a "channel designation" 32 therethrough.

Each of the terminal stations 5-1, 5-2 receive the "channel designation" 32 at the MCA control unit 512 (FIG. 3) in the network terminal unit 504a or 504b through cross point "d" or "e", and indicate the "channel designation" to the data channel unit 513 (FIG. 3).

The communication control unit 533 (FIG. 3) in the data channel unit 513 instructs the RF unit 511 and the IF unit 531 to create a communication available condition, for example, such that the terminal station 5-1 can capture a data channel for transmission (T) through a cross point "f" and a data channel for reception (R) through a cross point "i", while the terminal station 5-2 can capture a data channel for transmission (T) through a cross point "h" and a data channel for reception (R) through a cross point "g" in accordance with the numbers of a designated data channels.

Although not illustrated, other terminal stations connected to the downlink control channel c-d2 also receive the "channel designation" 32 simultaneously with the terminal stations 5-1, 5-2. However, if the number of the destination station included in the "channel designation" 32 is not coincident with the number of a terminal station which has received the "channel designation" 32, the received "channel designation" 32 is ignored. Also, other terminal stations which have issued a communication request simultaneously with the terminal station 5-1 operate under a collision preventing algorithm in accordance with the Slotted ALOHA scheme, and capture a data channel specified by the line control unit 104.

The line control unit 104 assigns a channel to the terminal stations 5-1, 5-2, which are to communicate with each other, based on a service condition previously determined by a subscription contract and registered in the line control unit 104 and on traffic situations of data channels.

An audio channel is different from a data channel in the following aspects when they are implemented by traffic channels.

(1) An audio channel requires two traffic channels for achieving simultaneous call transmission and reception between terminal stations, i.e., the full-duplex communication, as illustrated in FIG. 8. This is because a signal flowing through a transmission path is not a base band signal but a modulated carrier.

On the other hand, a data channel can be formed of one traffic channel as illustrated in FIG. 5 since IEEE 802.3, which is the standard of the LAN scheme, employs the half-duplex communication.

In the TDMA scheme, the data channel is also configured to require two time slots for uplink and downlink, i.e., two channels because the data channel is adapted for the full-duplex communication like the audio channel, is intended to transmit coded signals, and cannot combine signals in both directions on a transmission path.

(2) In the audio channel, a ring back tone and a response from a call receiving terminal station are sent through a specified audio channel. The data channel of this embodiment uses a control channel to send signals indicative of "response", "connection completed", and so on, as illustrated in FIG. 6.

In a terminal station which has captured a data channel, the communications program executed by the personal computer 507 proceeds to the next stage, where a communication can be started, for example, in accordance with a LAN protocol such as TCP/IP or the like.

The communication control unit 533 in the network terminal unit 504a monitors the head and the end of a frame in accordance with the TCP/IP protocol, as mentioned above, and newly produces a data packet illustrated in FIG. 4 based on data in the frame. The data packet produced herein is structured to enable the delay base communication which has a function corresponding to CSMA/CD of IEEE 802.3 to prevent collisions and further to enable transmission between terminal stations in accordance with the connectionless communication on each traffic channel.

Next, description will be made on the operation of a function corresponding to CSMA/CD of IEEE 802. 3 for preventing collisions.

The communication control unit 533 monitors whether the carrier is present on a data channel captured through the modulator/demodulator unit 532. If no carrier is detected on the data channel, the transmission of a data packet can be immediately started.

If the carrier is detected, the calling terminal station 5-1 delays the transmission until the data channel becomes empty. Then, the terminal station 5-1 reconfirms an empty state of the data channel in a certain time period after the detection of the carrier, and subsequently starts the transmission of data packets.

Further, since a collision due to simultaneous transmission may occur with a certain probability even if the above-mentioned control is provided, it is necessary to stop data packets which have collided as soon as they are detected. For this purpose, a terminal station which transmits data packets, for example, the terminal station 5-1 receives a transmitted signal at a cross-point "if" through a cross-point "i" to collate it with a data packet currently under transmission. If a discrepancy therebetween exceeds a predetermined amount, the terminal station 5-1 determines the occurrence of a collision and cancels the transmission of the data packet in the middle.

At the end of a communication, each terminal station issues a "call end request" 34 in response to an AT command "on-hook" 33 transmitted from the personal computer 507a in the calling terminal station 5-1, as illustrated in FIG. 6. A terminal station which does not on-hook even after the "call end request" 34 from the calling terminal station 5-1 has been issued is automatically forced into an on-hook state at the time a timer counts a predetermined time period after the "call end request" has been issued.

As described above, under the basic control operation of the MCA scheme using a control channel, the audio channel and the data channel can be selectively controlled in accordance with either the instantaneous communications scheme or the delay base communications scheme. In addition, the assignment of a channel can be freely performed to support a variety of communication services.

It should be noted that a various kinds of services can be provided to communications between terminal stations. For example, the head end 1 may be provided with a function of setting and managing conditions of communication services for each terminal station. The conditions of communication services set in the head end 1 may be an upper limit of data channel occupation time assigned to each terminal station, data channel waiting time for each terminal station, a data transmission rate of a data channel for each terminal station, and so on. Further, a plurality of groups comprising one or a plurality of terminal stations may be registered such that the service conditions are set independently to each of the groups. When a terminal station of a particular subscriber is provided with more advantageous service conditions, a higher rate will be charged.

The management of the service conditions for each terminal station or for each group is performed in the head end 1, for example, in the following manner. A table showing identification information for identifying respective terminal stations, such as identification codes of the network terminal units 503, 504 of all subscribers or subscribers, numbers, and service conditions corresponding to the respective terminal stations is previously stored in a memory (not shown) in the communication management unit 105. When a connection request is issued from a terminal station, the head end 1 detects the identification information from the connection request from the terminal station and looks up the table to retrieve service conditions defined for this terminal station. The head end 1 manages communication time between terminal stations, waiting time, or data transmission rate based on the retrieved service conditions.

Alternatively, information on communication available time may be included in a signal indicative of channel designation 32 (FIG. 6) from the line control unit 104 together with the telephone number of a destination terminal station, the telephone number of a calling terminal station, and a traffic channel number. A terminal station which has received the channel designation 32 and is ready for a communication starts a timer (not shown) to count the time simultaneously with the initiation of the communication. At the time the timer reaches the previously set communication available time, each terminal station generates a "call end request" 34.

The foregoing embodiment has been described in connection with a 6 MHz band in which all of control channels and traffic channels are accommodated.

When a system having a large capacity is required, or when the transmission characteristics of a CATV network is too bad to ensure a required channel capacity due to a limit of maximally transmittable power or the like if a frequency band is shared by audio channels and data channels as illustrated in FIG. 2(B), a control channel and audio channels may be assigned to a 6 MHz band, with data channels assigned to another 6 MHz band. In this way, the number of channels can be increased.

Even in a system having a large capacity using a plurality of television channels, a common control channel may be used without damaging the uniformity of control.

Further, if an increase in capacity results in traffic of a control channel itself exceeding the capability of a single channel, two or more control channels may be provided to cope with this situation.

While the narrowband transmission has been described to be advantageous in a CATV network suffering from much noise ingress, the narrowband is not necessarily employed if the present invention is applied to an improved CATV network with less noise ingress. In this case, a data channel may be provided with a wider bandwidth to support higher speed data transmission for the CATV network.

For example, a modified system can be built in the following manner. An entire 6 MHz band, such as that employed by the aforementioned TDMA scheme, is divided into four 1.5 MHz bands with a transmission rate of approximately 2 Mbps, and this 1.5 MHz band is added as part of data channels such that the data channels are uniformly controlled under the MCA scheme using a narrowband control channel.

When the traffic of a data channel is managed by the line control unit 104 in the head end 1, the network terminal unit 503 in each terminal station can measure the number of packets produced per unit time, an average value and a maximum value of waiting time, and so on. If these values are reported to the line control unit 104 through a control channel at predetermined intervals, the head end 1 can generally capture and manage the traffic situation of the overall communications system.

With a fixed rate accounting system which charges a fixed rate for communication services irrespective of how long such services are provided, subscribers may continuously utilize the services for a long time. To prevent this inconvenience, the head end 1 may be provided with a "communication time limit" function for indicating a communication available time to each terminal station at the time the "channel designation" 32 is issued in FIG. 6. By regularly setting the communication available time in the communication management unit 105 in the head end 1, the foregoing control can be achieved.

For setting an upper limit of the transmission rate available to the terminal station for each subscriber, an upper limit of a clock rate on the terminal interface line 515 may be modified in the terminal I/F unit 534 in the network terminal unit 503 of the terminal station. The modification to the clock rate may be carried out by operating a switch arranged in the network terminal unit 503 of the terminal station or by remotely controlling the network terminal unit 503 of the terminal station from the communication management unit 105 in the head end 1 through the line control unit 104.

In some communications utilizing a CATV network, data which requires high speed transmission and temporal continuity may be transmitted, for example, as is the case of a moving picture (which, however, is not a normal NTSC television signal but a moving picture signal having a reduced number of frames per unit time). Such a data signal is transmitted in accordance with a line control which permits terminal stations, communicating with each other, to occupy a channel until the data signal is fully transmitted. For example, on a 300 KHz channel, signals can be transmitted at a rate of approximately 384 Kbps. If an apparatus connected to a terminal station having a signal transmission rate sufficiently lower than a signal transmission rate of a channel, a plurality of terminal stations may be assigned to a single channel. In this case, a terminal station on the reception side should have a buffer memory with a capacity corresponding to a maximum waiting time determined by a total traffic amount of the terminal stations assigned to a single channel under the CSMA/CD scheme. In this way, the terminal station on the reception side can absorb variations in time intervals of arriving packets by the buffer memory to receive the packets as continuous data.

The audio channel described in the foregoing embodiment has shown an example of analog audio channels based on the FM radio technology. According to the present invention, even a system based on a narrowband frequency division multiplexing scheme as illustrated in the embodiment can be fully digitized, if an SCPC digitized radio system using a band of 12.5 KHz or less, which is now under investigation in the field of radio communications, or an OFDM (Orthogonal Frequency Division Multiplexing) scheme belonging to multi-carrier multi-value modulation, which is also under investigation for surface wave digital television broadcasting in Europe and Japan, is applied to the audio channel of the embodiment.

Further, for configuring a plurality of traffic channels in a certain bandwidth, a code division multiple access scheme (hereinafter abbreviated as the "CDMA scheme") may be used other than the aforementioned frequency division multiplexing scheme. The CDMA scheme, which is also one of the SCPC schemes, separates channels using pseudo-noise codes to readily configure a multiplexing communication path as illustrated in FIG. 5.

In addition, the CDMA scheme has been determined to be employed in part of radio systems in the United States as the scheme providing the highest frequency utilization efficiency in the field of radio communications. If the CDMA scheme becomes more popular in the future to result in providing associated devices or the like at lower cost, the CDMA scheme may also be applied to systems as described in the foregoing embodiment.

As can be understood from the foregoing, the present invention provides a communications system based on the conventional MCA/C scheme which can support a variety of communication services ranging from ordinary telephone call to high speed data transmission and present the highest frequency unitization efficiency as compared with currently known other systems.

Also, the communications system of the present invention is resistant to the influence of noise ingress and reflected waves, thereby making it possible to reduce a cost required to improve existing CATV networks.

Since communications on a data channel of the present invention are based on a delay base communications scheme similar to that employed in LAN, it is possible to effectively utilize the difference in rate between a line and terminals as well as inoperative time of the terminals.

Since the present invention employs the half-duplex communications scheme for communications on a data channel, only one channel is required, thereby making it possible to realize a system having an extremely high line utilization ratio, as compared with a line switching type which requires two channels because of the full-duplex communications scheme.

For reference, the numbers of simultaneously operable terminals, when using a 1.5 MHz band for data channels, are calculated for three kinds of terminals which operate respectively at different data transmission rates of 64 Kbps, 32 Kbps, and 19.2 Kbps, for comparing a TDMA system with the system of the present invention. The results are as follows.

As a general condition, the TDMA system uses main specifications described on a table of FIG. 12. It is assumed that the system of the present invention employs a data channel having a 300 KHz bandwidth and capable of transmitting at a rate of 384 Kbps, as described in the foregoing embodiment, and permits a maximum waiting time up to ten times the length of a packet.

The TDMA system has a line capacity calculated by 64 Kbps×24 channels over the 1.5 MHz band. A pair of terminals use two channels irrespective of the transmission rate thereof, as mentioned above. Thus, the number of simultaneously operable terminals is 24 (12 pairs) irrespective of the kind of terminals.

In the system of the present invention, the line capacity over the 1.5 MHz band is 30 channels when calculating with terminals operable at 64 Kbps. Assuming that the utilization ratio of CSMA/CD permitting a maximum waiting time up to ten times the length of a packet is 0.8, and a loss due to the production of a packet (due to the addition of a header portion and a trailer portion to the packet) is 0.9, the number of simultaneously operable terminals are 42 units (21 pairs) for 64 Kbps terminals, 84 units (42 pairs) for 32 Kbps terminals, and 168 units (84 pairs) for 19.2 Kbps terminals.

Since the control in accordance with the MCA scheme using a control channel can freely manage the assignment of services to a plurality of data channels, a variety of services can be provided to individual data channels, including a service corresponding to line switching which permits occupation of a data channel, a service which ranks terminals in accordance with the lengths of their waiting times, classification of terminals based on the transmission rate, and so on. Thus, upon introducing a fixed rate accounting system, various categories of rates can be set corresponding to various services, thereby making it possible to realize an extension of unique business which cannot be provided by conventional communication business.

When a plurality of channels are available, different bandwidths and transmission rates can be set to the individual channels, thereby making it possible to extend the communication system of the present invention to higher speed communication services.

Since the communication system of the present invention employs a modulator/demodulator unit for a 300 KHz band and a rate of 384 Kbps, anticipated to be most widely utilized of all data channel bands, similar to modulator/demodulator units used in PHS's which are anticipated to be spread from now on, a reduction in cost is expected resulting from a mass production effect.

What is claimed is:

1. A multimedia communication system comprising:
   a central station including control means;
   a plurality of terminal stations communicating with each other through said central station, said terminal stations including at least audio communication terminals and data communication terminals; and
   a communication path coupled with said central station and said terminal stations, said communication path comprising both an uplink and downlink, each of said uplink and downlink having at least two types of communication channels, one of which is dedicated communication channels assigned between said terminal stations, the other of which is common communication channels commonly assigned to a plurality of said terminal stations in a multiplexing transmission manner, said control means being so designed that said dedicated communication channels are assigned for transmission of audio signals from said audio communication terminals, and said common communication channels are assigned for transmission of data signals from said data communication terminals, in accordance with the type of transmission signals when a communication request is issued from one of said terminal station.

2. A communication system according to claim 1, wherein:
   said communication path includes a plurality of traffic channels to which said common communication channels and said dedicated communication channels are set and one or more control channels through which control signals are transmitted; and
   said control means is responsive to a communication request from one or more of said plurality of terminal stations to assign one or more of said plurality of traffic channels to said one or more terminal stations which have issued the communication request and to transmit a control signal indicating the assigned traffic channels to said terminal stations through said control channel.

3. A communication system according to claim 2, wherein a frequency band of said communication path is divided into a plurality of bands, and said plurality of traffic channels are set in each of the divided bands in a frequency multiplexing manner.

4. A communication system according to claim 3, wherein said plurality of traffic channels have different bandwidths from each other.

5. A communication system according to claim 2, wherein each of said plurality of terminal stations is assigned a unique code, and said plurality of traffic channels are set in said communication path in accordance with a code division multiplexing scheme.

6. A communication system according to claim 2, wherein frequency bands of said dedicated communication channels and frequency bands of said common communication channels are alternately arranged in a predetermined frequency band.

7. A communication system according to claim 2, wherein frequency bands of said dedicated communication channels and frequency bands of said common communication channels are mixed in an arbitrary order in a predetermined frequency band.

8. A communication system according to claim 2, wherein said central station includes service managing means operable when a communication request is issued from a terminal station for setting an upper limit to an available time of said common signal channel which is assigned to said terminal station.

9. A communication system according to claim 8, comprising a plurality of groups including one or more terminal stations, wherein said service managing means of said central station sets an upper limit to said available time for each of said groups.

10. A communication system according to claim 2, wherein said central station includes service managing means for setting a waiting time for said communication signal channel for each terminal station.

11. A communication system according to claim 10, comprising a plurality of groups including one or more terminal stations, wherein said service managing means of said central station sets said waiting time for each of said groups.

12. A communication system according to claim 2, wherein said central station includes service managing means for setting a data transmission rate on said common signal channel for each terminal station.

13. A communication system according to claim 12, comprising a plurality of groups including one or more terminal stations, wherein said service managing means of said central station sets a data transmission rate for each of said groups.

14. A communication system according to claim 1, wherein:
   said communication path includes a plurality of traffic channels to which said common communication channels and said dedicated communication channels are set and one or more control channels through which control signals are transmitted; and
   said control means includes:
      means responsive to a communication request from one or more of said plurality of terminal stations to assign one or more of said plurality of traffic channels to said one or more terminal stations which have issued the communication request and to transmit a control signal indicating the assigned traffic channels to said terminal stations through said control channel; and
      means operable when a plurality of different signals exist on a common communication channel for controlling to transmit only one signal on said common communication channel to avoid a collision of signals.

15. A multimedia communication system according to claim 1, wherein
   said control means is so designed that two channels of said dedicated communication channels in said uplink and two channels of said dedicated communication channels in said downlink are used for transmission of said audio signals, whereby full-duplex audio communication is performed.

16. A multimedia communication system according to claim 1, wherein
   said control means is so designed that a channel of said common communication channels in said uplink and a channel of said common communication channels in said downlink are used for transmission of said data signals, whereby half-duplex data communication is performed.

17. A multimedia communication system according to claim 1, wherein
   said multimedia communication system is a CATV broadcasting system; and
   said downlink of said communication path further includes at least one television channel for transmission of television signals.

18. A multimedia communication system according to claim 17, wherein
   said control means is so designed that two channels of said dedicated communication channels in said uplink and two channels of said dedicated communication channels in said downlink are used for transmission of said audio signals, whereby full-duplex audio communication is performed.

19. A multimedia communication system according to claim 17, wherein
   said control means being so designed that a channel of said common communication channels in said uplink and a channel of said common communication channels in said downlink are used for transmission of said data signals, whereby half-duplex data communication is performed.

* * * * *